United States Patent Office 3,496,273
Patented Feb. 17, 1970

3,496,273
1,2,α-METHYLENESTEROIDS
Henry Laurent, Hermann Steinbeck, and Rudolf Wiechert, Berlin, Germany, assignors to Schering AG, Berlin, Germany
No Drawing. Filed Mar. 19, 1968, Ser. No. 714,342
Claims priority, application Germany, Mar. 23, 1967, Sch 40,435; Mar. 31, 1967, Sch 40,469; Jan. 11, 1968, Sch 41,823
Int. Cl. A61k 17/00
U.S. Cl. 424—241                  20 Claims

ABSTRACT OF THE DISCLOSURE

The 1,2α-methylenesteroid of the formula

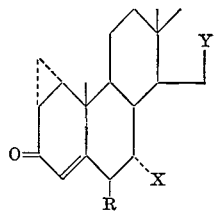

wherein R is hydroxy, acyloxy or alkoxy, or is fluorine, chlorine or bromine, wherein X is a chlorine or bromine atom and wherein Y is one of the following groups

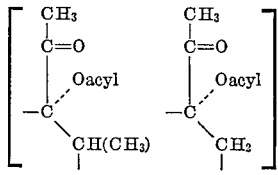

or

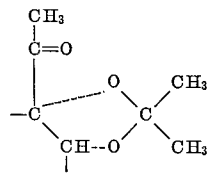

An example of the novel compounds obtained by the process of the invention is 6β,7α-dibromo-1,2α-methylene-Δ⁴-pregnene-17α-ol-3,20-dione-acetate. The compounds obtained have a high progestational action with only slight antiandrogenic side effects and do not exhibit any suppression of ovulation even at high doses.

BACKGROUND OF THE INVENTION

7α-halogeno-6β-acyloxysteroids have been disclosed in U.S. Patent No. 2,937,975. The process of making these compounds requires an extended heating of either Δ$^{1,4,6}$- or Δ$^{4,6}$- unsaturated 3-ketones with tert. butylhypochlorite or -hypobromite in the presence of an organic carboxylic acid. However, the tert. butylhypohalogenites decompose easily and are difficult to handle. An attempt has therefore been made previously to replace these compounds by other substances suited to split off a positive halogen. It turned out, however, that the processes of the U.S. patent cannot be carried out in a desired manner if, for instance, tert. butylhypobromite is replaced by N-bromosuccinimide. There results in this case a mixture of substances which are very hard to separate.

With the tert. butylhypobromite not only a high reaction temperature and long reaction time are necessary, but it is also impossible to introduce a hydroxy or alkoxy group or a halogen atom into the 6-position. This direct addition of HOCl- and HOBr-group upon formation of the corresponding 7,6-halohydrins is of great importance, since the halohydrins are valuable intermediates for making highly effective steroid compounds.

SUMMARY OF THE INVENTION

It is therefore an object of the present invention to provide for the formation of steroid compounds of the partial formula

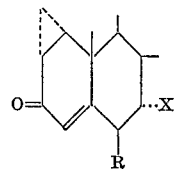

wherein R is hydroxy, acyloxy or alkoxy, or is fluorine, chlorine or bromine, and wherein X is chlorine or bromine, which proceeds in a technically acceptable manner without requiring high reaction temperatures and long reaction times.

It is a further object to provide for a process of making the steroid compounds of the above formula wherein not only an acyloxy group but also a hydroxy or alkoxy group or a halogen atom may be introduced into the 6-position.

It is another object of the present invention to provide for the making of new steroid compounds that have a high progestational action with only minor antiandrogenic side effects. It is a further object to provide for compounds with these properties which in addition do not effect a significant suppression of ovulation.

These objects are accomplished by a process wherein a 1,2α-methylene-Δ$^{4,6}$-3-ketosteroid which is free of isolated carbon-to-carbon double bonds is concurrently reacted with (a) a compound adapted to furnish a positive halogen and (b) a nucleophilic reagent so as to replace the Δ$^6$ double bond with substituents in the 6- and 7-position. The product obtained may then be subjected to further esterification of hydroxy groups that have either been initially present or have been introduced thereto.

The invention also embraces the compounds having the above partial formula.

DESCRIPTION OF THE PREFERRED EMBODIMENTS

The invention is based on the concept that, for instance, the simultaneous addition of a 6-acyloxy group and of a halogen atom in the 7-position is possible upon using N-halogeno-succinimide as reagent under very mild reaction conditions and with excellent yields if one proceeds from Δ$^{4,6}$-3-ketosteroids which are substituted by a methylene group in the 1,2α-position. The process of the invention results in completion of the addition reaction usually at room temperature after only 30 to 60 minutes reaction time, while the reaction of steroids that are not methylenated in the 1,2-position upon use of tert. butylhypohalogenites, as disclosed in U.S. Patent No. 2,937,975, requires reaction temperatures of about 100° C. and reaction times up to 3 hours.

It has also been found that with the process of the invention it is possible to introduce not only an acyl-group but a hydroxy- or alkoxy-group or a halogen atom into the 6-position. These groups are of specific importance, since the 7,6-halohydrins are valuable intermediates for making other highly active steroids. They cannot be obtained by saponification of the 6β-acyloxy-7α-halogenosteroids, since under basic reaction conditions the latter lead immediately to the 6,7β-epoxide compounds. In distinction, there is no difficulty in esterifying, for instance, a free 6β-hydroxy-group.

The initial material can include other groups which are inert to the reagents employed in the reaction. Such inert groups are, for instance, oxo-, free or functionally modified hydroxy- or alkyl-groups or halogen atoms. On the other hand, the initial compounds should be free of isolated carbon-to-carbon bonds. Keto-groups (C=O) are not harmful. For the purpose of this specification and the attached claims, the term "isolated C=C bonds" refers to carbon-to-carbon double bonds other than carbon-to-carbon double bonds in a conjugated position either to keto-groups or to other carbon-to-carbon double bonds. Such isolated C=C bonds must be avoided, since they would be affected by the reagents employed.

The process is carried out by permitting a positive halogen and, concurrently therewith, a nucleophilic reagent to act upon the $\Delta^6$ double bond of a 1,2α-methylene $\Delta^{4,6}$-3-ketosteroid.

The positive halogen is liberated during the reaction from a suitable halogen-containing compound. Such compounds are, particularly, N-chloro- or N-bromo-acylamides or -imides and more specifically -acetamides and -succinimides, hypohalogenites such as tert. butylhypochlorite and tert. butylhypobromite as well as elemental chlorine or bromine.

Positive bromine is formed also from bromides in combination with positive chlorine, for instance from lithiumbromide together with N-chloro-succinimide. Positive halogen-furnishing compositions are also the alkali and alkaline earth hypohalogenites.

Depending on the choice of the nucleophilic reagent it is possible concurrently to introduce the desired substituted R into the 6β-position, as exemplified by the following table:

| R group introduced | Reagent employed |
| --- | --- |
| A hydroxy group | Water in the presence of a strong acid in an inert solvent. |
| A formyloxy group | Dimethylformamide in the presence of an anhydrous acid. |
| An acyloxy group | A carboxylic acid in the presence of an anhydrous acid. |
| An alkoxy group | An alcohol in the presence of an anhydrous acid. |
| A chlorine atom | A chloride in the presence of an anhydrous carboxylic acid and a strong anhydrous acid or hydrogen chloride in an inert anhydrous solvent. |
| A bromine atom | A bromide in the presence of an anhydrous carboxylic acid and a strong anhydrous acid or hydrogen bromide in an inert anhydrous solvent. |
| A fluorine atom | Hydrogen fluoride acid in an inert anhydrous solvent or a fluoride in the presence of an anhydrous carboxylic acid and a strong anhydrous acid. |

The inert solvents for the introduction of a hydroxy-group may be either water-miscible solvents, such as dioxane or tetrahydrofuran or water-immiscible solvents such as diethylether.

Dimethylformamide, carboxylic acids and alcohols can serve simultaneously as nucleophilic reagents and as solvents for the reaction components in connection with the introduction of a formyloxy-, acyloxy- or alkoxy-group.

Perchloric acid is the preferred strong (water-containing) acid, while hydrogen chloride in tetrahydrofuran or dioxane are preferred as the anhydrous acid.

The reaction temperature can be varied within a wide range. It depends essentially on the stability of the reaction agents. Optimum yields are obtained at low temperatures, for which reason the addition reaction is preferably carried out at room temperature. The reaction is usually complete after between 30 and 60 minutes.

The starting products in the process of the invention can be taken from the androstane or pregnane series. Preferred starting products are the esters of 1,2α-methylene-$\Delta^{4,6}$-pregnadiene-17α-ol-3,20-dione and the 16α-methyl- and 16α-hydroxy- derivatives of these compounds. The 16α-hydroxy derivative is particularly useful as the 16,17-acetonide or acetophenide. Preferred starting products are also the 1,2α-methylene-$\Delta^{4,6}$-androstadiene-17β-ol and its esters.

By means of the process of the invention, it is possible to form certain novel compounds of the pregnane series which have a high progestational action with only minor antiandrogenic side effects These new progestational compounds surprisingly do not produce a central suppressive action (ovulation suppression) even at high doses The compounds of the invention are also important intermediates for producing other active steroids. For instance, the 6β-hydroxy- or 6β-acyloxy-7α-halogenosteroids can be converted by treatment with a base into the corresponding highly active 6β,7β-epoxides. These latter compounds have a strong progestational action, particularly upon oral administration, and likewise have practically no antiandrogenic side effects and do not produce central suppressive effects (ovulation suppression) at high doses. They form the subject matter of an application filed by the same inventors on even date herewith (Ser. No. 714,341).

The superior properties of the compounds of the invention are shown in the following table, wherein the compounds I to IV of the invention are compared with a well-known prior art progestational compound listed as V.

| No. | Compound | Clauberg-test unit value (mg.) | | Ovulation suppression (H) | | | | Antiandrogenic action | | | | |
| | | s.c. | p.o. | s.c. | | p.o. | | s.c. | | p.o. | | |
| | | | | Dose (mg.) | Percent H | Dose (mg.) | Percent H | Dose (mg.) | s.v. | pr. | s.v. | pr. |
| --- | --- | --- | --- | --- | --- | --- | --- | --- | --- | --- | --- | --- |
| I | 6β,7α-dibromo-17-acetoxy-1,2α-methylene-4-pregnene-3-20-dione. | 0.003–0.01 | 0.03–0.1 | 0.3 | 0 | 10.0 | 0 | 10.0 | | | 14 | 0 |
| | | | | | | | | 3.0 | 10 | 8 | 0 | 0 |
| | | | | | | | | 1.0 | 1 | 8 | | |
| II | 6β-chloro-7α-bromo-17-acetoxy-1,2α-methylene-4-pregnene-3,20-dione. | 0.03–0.1 | 0.003 | 1.0 | 0 | 10.0 | 0 | 10.0 | | | 28 | 20 |
| | | | | | | | | 3.0 | 38 | 11 | 6 | 3 |
| | | | | | | | | 1.0 | | | 1 | 3 |
| III | 6β-fluoro-7α-chloro-17-acetoxy-1,2α-methylene-4-pregnene-3,20-dione. | 0.03–0.1 | 0.03–0.1 | 3.0 | 0 | 3.0 | 0 | 3.0 | 40 | 25 | | |
| | | | | | | | | 1.0 | 18 | 8 | | |
| IV | 6β-formyloxy-7α-bromo-17-acetoxy-1,2α-methylene-4-pregnene-3,20-dione. | 0.01 | 0.003–0.01 | 0.3 | 0 | 10.0 | 0 | 10.0 | | | 22 | 28 |
| | | | | | | | | 3.0 | 46 | 32 | 14 | 7 |
| | | | | | | | | 1.0 | 0 | 3 | 4 | 0 |
| V | 6-chloro-17-acetoxy-4,6-pregnadiene-3,20-dione (for comparison). | 0.01–0.03 | 0.03 | 0.3–1.0 | 50 | 1.0–3.0 | 50 | 3.0 | 83 | 73 | 44 | 45 |
| | | | | | | | | 1.0 | 75 | 57 | 18 | 15 |
| | | | | | | | | 0.3 | 16 | 8 | 0 | 0 |

In order to determine the progestational effect, the limit value to obtain an affirmative action was established in infantile rabbits by way of the Clauberg Tests. The ovulation suppression was checked by tube inspection.

Antiandrogenic action was tested in castrated male rats weighing about 100 g. The tested compound was administered to the animals 7 days after castration for a period of 7 days in daily graded doses subcutaneously (s.c.) or per os (p.o.). The animals received a daily dose also throughout the same period of 0.1 mg. of testosterone propionate subcutaneously. The animals were killed on the 8th day and the weight of the sex glands was determined. The percentage suppression of growth effected by the tested compound of the seminal vesicle (s.v.) and of the prostate (pr.) gland was then determined.

As appears from the table, the novel compounds (I to IV) were at least as effective progestationally as 6-chloro-17-acetoxy-4,6-pregnadiene-3,20-dione (Compound V). A particular advantage of the new compounds is that, compared with a known progestational compound such as the Compound V, they have only a minor anti-androgenic side effect and no antiovulatory suppression effect. The new 7α-halogeno-pregnanes are thus specifically suited for a progestational therapy. The main application of the compounds of the invention is in the treatment of the following gynecological disorders: primary and secondary amenorrhea, cycle irregularities in the case of insufficient yellow body function, endometritis, hypoplasia of the uterus, premenstrual compaints and mastopathy.

The dosage depends on the seriousness of the individual sickness. Generally, a daily dose between 5 and 100 mg. of active substance may be indicated.

The compounds of the invention can be used in pharmaceutical preparations suited for either oral or parenteral (intramuscular) application. In the case of tablets, the contents of active material per tablet should be between 0.5 and 10 mg. In the case of aqueous solutions for oral application, the contents of active compounds should be between 0.5 and 2 mg. per 1 ml., and in the case of oily solutions for intramuscular injection, it should be between 1 and 20 mg. per 1 ml.

The pharmaceutical compositions can be prepared in conventional manner by combining the active materials with suitable additives, carrier substances and flavoring substance.

Carrier vehicles for the active compounds may be organic or inorganic materials which are suited for enteral or parenteral application and which do not enter into reaction with the new compounds, such as water, alcohols, vegetable oils, polyethyleneglycols, lactose, starch, talcum, gelatin, magnesium stearate or sodium lauryl sulfate.

A suitable composition for a tablet would be, for instance, the following:

| | Mg. |
|---|---|
| 6β - chloro-7α-bromo-17-acetoxy-1,2α-methylene-4-pregnene-3,20-dione | 5.000 |
| Lactose | 24.000 |
| Cornstarch | 45.065 |
| Talcum | 4.000 |
| Gelatin | 1.400 |
| Sodium lauryl sulfate | 0.500 |
| p-Oxybenzoic acid methylester | 0.024 |
| p-Oxybenzoic acid propylester | 0.011 |
| | 80.000 |

A suitable oily solution for intramuscular injection should, for instance, contain per each ml. of solution the following:

| 2.0 mg. | 6 β-chloro-7α-bromo-17-acetoxy-1,2α-methylene-4-pregnene-3,20-dione |
|---|---|
| 20.0 mg. | Benzylalcohol and |
| 905.9 mg. | Sesame oil |
| 927.9 mg. | =1 ml. |

The following examples will illustrate the invention without any intention of limitation.

Example I

A solution of 5.0 g. 1,2α-methylene-$\Delta^{4,6}$-pregnadiene-17α-ol-3,20-dione-acetate in 200 ml. dioxane was reacted with 5.0 g. N-bromo-succinimide, 50 ml. water and 5 ml. 70% perchloric acid. The mixture was subjected to stirring at room temperature for 75 minutes and was precipitated with water containing sodium sulfite. The precipitate was removed by suction, washed with water and dried in vacuo. The crude product was recrystallized from acetone/hexane. There was obtained 4.43 g. 7α-bromo - 1,2α-methylene-$\Delta^4$-pregnene-6β,17α-diol-3,20-dione-17-acetate; M.P. 185–185.5° C. UV: $\epsilon_{230}=12,900$.

Example II

A solution of 5.0 g. 1,2α-methylene-$\Delta^{4,6}$-pregnadiene-17α-ol-3,20-dione-acetate in 250 ml. dioxane was reacted with 20.0 g. N-chlorosuccinimide, 135 ml. water and 12.5 ml. 70% perchloric acid. The reaction was complete at room temperature after 90 minutes. The mixture was poured into sodium sulfite containing water and the precipitate was removed by suction and taken up in methylenechloride. It was then washed with water and dried over sodium sulfate, whereupon the solvent was removed by evaporation in vacuo. The residue was recrystallized from methylenechloride/diisopropylether. There was obtained 2.24 g. 7α-chloro-1,2α-methylene-$\Delta^4$-pregnene-6β,17α-diol-3,20-dione-17-acetate; M.P. 239–239.5° C. UV: $\epsilon_{230}=12,900$.

Example III 4.0 g. 1,2α-methylene-$\Delta^{4,6}$-pregnadiene-17α - ol - 3,20-dione-acetate were dissolved in 200 ml. conc. acetic acid. There was then added 20.0 g. lithiumchloride, 4.0 g. N-chlorosuccinimide and 4.0 ml. hydrogen chloride saturated tetrahydrofuran. The mixture was then subjected to stirring for 90 minutes at room temperature and was thereafter poured into water. The precipitate was removed by suction, washed neutral with water, dried in vacuo and subjected to chromatography over silica gel. Using 21–25% acetone/pentane, there was obtained after recrystallization from acetone/hexane 1.94 g. 6β,7α-dichloro-1,2α-methylene-$\Delta^4$-pregnene-17α-ol-3,20 - dione-acetate; M.P. 247–248° C. UV: $\epsilon_{234}=12,300$.

Example IV 5.0 g. 1,2α - methylene - $\Delta^{4,6}$-pregnadiene-17α-ol-3,20-dione-acetate was dissolved in 65 ml. absolute trichloroethylene and was reacted with a solution of 9.28 g. chlorine in 135 ml. absolute carbon tetrachloride. The mixture was diluted with chloroform after a reaction time of 2 hours at −20° C. It was then successively washed with dilute sulphuric acid, a sodium hydrosulfite solution, a sodium bicarbonate solution and water. The residue was subjected to chromatography over silica gel after drying and concentration by evaporation. After recrystallization from ethyl acetate, there was obtained 1.30 g. 6β,7α-dichloro - 1,2α - methylene-$\Delta^4$-pregnene-17α-ol-3,20-dione-acetate; M.P. 254–256° C. UV: $\epsilon_{234}=12,600$.

Example V

A solution of 500 mg. 1,2α-methylene-$\Delta^{4,6}$-pregnadiene-17α-ol-3,20-dione-acetate in 25 ml. conc. acetic acid was reacted wtih 2.5 g. lithium chloride, 500 mg. N-bromo-succinimide and 1.0 ml. hydrogen chloride saturated tetrahydrofuran. The mixture was subjected to stirring for 1 hour at room temperature and was then poured into water. The precipitate was removed by suction, washed neutral with water, dried in vacuo and recrystallized from acetone/hexane. There was obtained 405 mg. 6β-chloro-7α- bromo - 1,2α - methylene - Δ⁴-pregnene-17α-ol-3,20-dione acetate; M.P. 208–211.5° C. UV: $\epsilon_{235}=12,500$.

Example VI

A solution of 500 mg. 1,2α-methylene-Δ⁴,⁶-pregnadiene-17α-ol-3,20-dione-acetate in 25 ml. conc. acetic acid was reacted with 2.5 g. lithium bromide, 500 mg. N-bromosuccinimide and 1.0 ml. hydrogen chloride saturated tetrahydrofuran. The mixture was subjected to stirring for 30 minutes at room temperature and poured into water. The precipitate was removed by suction, washed neutral with water, dried in vacuo and recrystallized from acetone-hexane. There was obtained 630 mg. 6β,7α-dibromo-1,2α-methylene - Δ⁴-pregnene-17α-ol-3,20-dione acetate; M.P. 150–151.5° C. UV: $\epsilon_{240}=12,200$.

Example VII

A solution of 500 mg. 1,2α-methylene-Δ⁴,⁶-pregnadiene-17α-ol-3,20-dione-acetate in 25 ml. conc. acetic acid was reacted with 500 mg. N-chlorosuccinimide and 1.0 ml. hydrogen chloride saturated tetrahydrofuran. The mixture was then stirred for one hour at room temperature and poured into water. The precipitate was removed by suction, washed neutral with water, dried in vacuo and recrystallized from acetone/hexane. There was obtained 395 mg. 7α-chloro-1,2α-methylene-Δ⁴-pregnene-6β,17α - diol-3,20-dione-acetate; M.P. 237–238° C. UV: $\epsilon_{230}=12,700$.

Example VIII

A solution of 250 mg. 1,2α-methylene-Δ⁴,⁶-pregnadiene-17α-ol-3,20-dione-acetate in 12 ml. conc. acetic acid was reacted with 250 mg. N-bromo-acetamide and 0.5 ml. hydrogen chloride saturated tetrahydrofuran. The mixture was subjected to stirring for 1 hour at room temperature and poured into water. The precipitate was removed by suction, washed neutral with water, dried in vacuo and recrystallized from acetone/hexane. There was obtained 145 mg. 7α-bromo-1,2α-methylene-Δ⁴-pregnene - 6α,17β-diol - 3,20 - dione - acetate; M.P. 194–195° C. UV: $\epsilon_{228}=13,500$.

Example IX

A solution of 500 mg. 1,2α-methylene-Δ⁴,⁶-pregnadiene-17α-ol-3,20-dione-acetate in 25 ml. conc. formic acid was reacted with 500 mg. N-chlorosuccinimide and 1.0 ml. hydrogen chloride saturated tetrahydrofuran. The mixture was subjected to stirring at room temperature for 1 hour and then poured into water. The precipitate was removed by suction, washed neutral with water, dried in vacuo and recrystallized from acetone-hexane. There was obtained 555 mg. 7α-chloro-1,2α-methylene-Δ⁴-pregnene - 6β,17α-diol-3,20-dione-6-formate-17-acetate; M.P. 246.5–248° C. UV: $\epsilon_{229}=12,600$.

Example X

A solution of 500 mg. 1,2α-methylene-Δ⁴,⁶-pregnadiene-17α-ol-3,20-dione-acetate in 25 ml. dimethylformamide was reacted with 500 mg. N-chlorosuccinimide and 1.0 ml. hydrogen chloride saturated tetrahydrofuran. The mixture was subjected to stirring for 1 hour at room temperature and then poured into water. The precipitate was removed by suction, washed neutral with water, dried in vacuo and recrystallized from acetone/hexane. There was obtained 230 mg. 7α-chloro-1,2α-methylene-Δ⁴-pregnene - 6β,17α-diol-3,20-dione-6-formate-17-acetate; M.P. 240.5–242.5° C. UV: $\epsilon_{230}=11,800$.

Example XI 10.0 g. 1,2α - methylene-Δ⁴,⁶-pregnadiene-17α-ol-3,20-dione-acetate was dissolved in 400 ml. dimethylformamide and then reacted with a solution of 1.86 g. chlorine in 22 ml. propionic acid. The reaction mixture was allowed to stand for 18 hours at −15° C. It was then stirred into ice water and the precipitate was removed by suction, taken up in methylenechloride and successively washed with dilute sulfuric acid, a sodium bicarbonate solution and water. After drying and concentration by evaporation, the residue was subjected to chromatography over silica gel. After recrystallization from ethyl acetate, there was obtained 1.80 g. 7α-chloro-1,2α-methylene-Δ⁴-pregnene-6β,17α-diol-3,20-dione-6-formate - 17 - acetate; M.P. 247–248° C. UV: $\epsilon_{230}=12,700$.

Example XII

A solution of 500 mg. 1,2α-methylene-Δ⁴,⁶-pregnadiene-17α-ol-3,20-dione-acetate in 25 ml. conc. formic acid was reacted with 500 mg. N-bromosuccinimide and 1.01 ml. hydrogen chloride saturated tetrahydrofuran. The mixture was subjected to stirring at room temperature for 1 hour and poured into water. The precipitate was then removed by suction, washed neutral with water, dried in vacuo and recrystallized from acetone/hexane. There was obtained 545 mg. 7α-bromo-1,2α-methylene-Δ⁴-pregnene-6β,17α-diol-3,20-dione-6-formate - 17 - acetate; M.P. 217–218.5° C. UV: $\epsilon_{230}=12,700$.

Example XIII

A solution of 100 mg. 1,2α-methylene-Δ⁴,⁶-pregnadiene-17α-ol-3,20-dione-acetate in 10 ml. methanol and 5 ml. dioxane was reacted with 100 mg. N-bromosuccinimide and 0.2 ml. hydrogen chloride saturated tetrahydrofuran. The mixture was subjected to stirring for 1 hour at room temperature and was then poured into water. The precipitate was removed by suction, washed neutral with water, dried in vacuo and recrystallized from acetone/hexane. There was obtained 110 mg. 7α-bromo-1,2α-methylene-Δ⁴-pregnene-6β,17α-diol - 3,20 - dione-17-acetate-6-methylether; M.P. 240–241° C. UV: $\epsilon_{230}=12,000$.

Example XIV

A solution of 500 mg. 1,2α-methylene-Δ⁴,⁶-pregnadiene-17α-ol-3,20-dione acetate in 50 ml. methanol and 25 ml. dioxane was reacted with 1.0 g. N-chloroacetamide, 0.2 ml. water and 2.0 ml. hydrogen chloride saturated tetrahydrofuran. The mixture was stirred for 16 hours at room temperature and then poured into water. The pecipitated product was removed by suction, washed neutral with water, dried in vacuo and recrystallized from acetone/hexane. There was obtained 355 mg. 7α-chloro-1,2α-methylene-Δ⁴-pregnene-6β,17α-diol - 3,20 - dione-17-acetate-6-methylether; M.P. 228–229.5° C. UV: $\epsilon_{228}=11,300$.

Example XV 200 mg. 1,2α-methylene-Δ⁴,⁶-androstadiene-17β-ol-3-one-acetate, 8 ml. dioxane, 2 ml. water and 0.2 ml. 70% perchloric acid were reacted in 200 mg. N-bromosuccinamide and stirred for 1.5 hours at room temperature. The mixture was then stirred into ice water and the precipitate was removed by suction, washed and dried. After recrystallization from ethyl acetate, there was obtained 180 mg. 7α-bromo-1,2α-methylene-Δ⁴-androstene-6β,17β-diol-3-one-17-acetate; M.P. 193–194° C. UV: $\epsilon_{230}=13,100$.

Example XVI 250 mg. 1,2α - methylene-Δ⁴,⁶-androstadiene-17β-ol-3-one-acetate, 8 ml. dioxane, 2 ml. water and 0.2 ml. 70% perchloric acid were reacted with 800 mg. N-chlorosuccinimide and stirred for 2.5 hours at room temperature. After the treatment described above in Example IV and recrystallization from ethyl acetate, there was obtained 110 mg. 7α-chloro-1,2α-methylene-Δ⁴-androstene-6β,17β-diol-3-one-17 acetate; M.P. 230–232° C. UV: $\epsilon_{230}=12,350$.

Example XVII 8 ml. anhydrous fluoric acid were reacted at −75° C. with 12 ml. tetrahydrofuran and 15 ml. methylenechloride, and 2.0 g. 1,2α-methylene-Δ⁴,⁶-pregnadiene-17α-ol-3,20-dione-acetate and 2.0 g. N-bromosuccinimide was then dissolved in this mixture. The total solution was stirred for 5 hours at −50° C. and poured into 1.5 liters of water containing 50 g. sodium bicarbonate. The product was then extracted with methylenechloride and the organic phase was washed with water and dried. The solvent was evaporated in vacuo. The residue was recrystallized from acetone/hexane. There was obtained 2.32 g. 6β-fluoro-7α-bromo-1,2α-methylene-Δ⁴-pregnene-17α-ol - 3,20 - dione-acetate; M.P. 218–219° C. UV: $\epsilon_{228}=12,200$.

Example XVIII

A solution of 500 mg. 16α-methyl-1,2α-methylene-Δ⁴,⁶-pregnadiene-17α-ol-3,20-dione-acetate in 35 ml. dioxane was reacted with 500 mg. N-bromosuccinimide, 5 ml. water and 5 ml. 70% perchloric acid. The mixture was then poured after 1 hour into water containing sodium sulfite. The precipitate was removed by suction, washed neutral and dried in vacuo. There was obtained 527 mg. 7α-bromo - 16α - methyl-1,2α-methylene-Δ⁴-pregnene-6β,17α-diol-3,20-dione-17-acetate. UV: $\epsilon_{230}=12,400$.

Example XIX

A solution of 1.0 g. 16α,17α-dimethylmethylenedioxy-1,2α-methylene-Δ⁴,⁶-pregnadiene-3,20-dione in 50 ml. dioxane was reacted with 4.0 g. N-chlorosuccinimide, 2.7 ml. water and 2.5 ml. 70% perchloric acid. The mixture was stirred for 90 minutes at room temperature and then poured into water containing sodium sulfite. The precipitate was removed by suction, washed neutral and dried in vacuo. There was obtained 971 mg. 7α-chloro-16α,17α-dimethylmethylenedioxy-1,2α - methylene-Δ⁴-pregnene-6β-ol-3,20-dione. UV: $\epsilon_{231}=11,700$.

Example XX 100 mg. 1,2α-methylene-Δ⁴,⁶-pregnadiene-17α-ol-3,20-dione-acetate was dissolved in 5 ml. conc. acetic acid, whereupon 0.1 ml. tert. butylhypochlorite was added and the mixture was stirred for 1 hour at room temperature. It was then poured into water and the precipitate was removed by suction, washed with water, dried and recrystallized from acetone/hexane. The yield was 83 mg. 7α-chloro-1,2α-methylene-Δ⁴-pregnene - 6β,17α - diol - 3,20-dione-diacetate; M.P. 233–235° C. UV: $\epsilon_{229}=12,900$.

Example XXI 250 mg. 7α-chloro-1,2α-methylene-Δ⁴-pregnene-6β,17α-diol-3,20-dione-17-acetate was dissolved in 1 ml. pyridine and 0.5 ml. acetanhydride. The mixture was allowed to stand for 20 hours at room temperature, was then heated for 4 hours to 100° C. and was finally poured into ice water. After suction, washing neutral and drying, the product was recrystallized from acetone/hexane. The yield was 213 mg. 7α-chloro-1,2α-methylene-Δ⁴-pregnene-6β,17α-diol-3,20-dione-diacetate; M.P. 239.5–240° C. UV: $\epsilon_{230}=12,700$.

Example XXII

A solution of 100 mg. 1,2α-methylene-Δ⁴,⁶-pregnadiene-17α,-ol-3,20-dione-acetate in 10 ml. hydrogen chloride saturated dioxane was reacted with 100 mg. N-bromosuccinimide and stirred for 20 minutes at room temperature. It was then poured into ice water and the precipitate was removed by suction, washed neutral with water, dried in vacuo and recrystallized from acetone/hexane. There was obtained 57 mg. 6β-chloro-7α-bromo-1,2α-methylene-Δ⁴-pregnene-17α-ol-3,20-dione-acetate; M.P. 207–208° C. UV: $\epsilon_{235}=12,100$.

Example XXIII

A solution of 1.88 g. 1,2α-methylene-Δ⁴,⁶-pregnadiene-17α-ol-3,20-dione-capronate in 80 ml. dioxane was reacted with 1.88 g. N-bromosuccinimide, 18 ml. water and 0.18 ml. 70% perchloric acid. The mixture was stirred for 1 hour at room temperature, reacted with water and subjected to extraction with methylenechloride. The extracted material was washed with a sodium bicarbonate solution, a sodium hydrosulfite solution and water, dried, and concentrated in vacuo. The residue was subjected to chromatography over silica gel. It was then subjected to elution with 15.8 to 17.3% acetone/pentane. There was obtained 1.37 g. 7α-bromo-1,2α-methylene-Δ⁴ - pregnene - 6β,17α- diol-3,20-dione-17-capronate. UV: $\epsilon_{232}=12,800$. The product was in the form of a viscous oil.

Example XXIV 8 ml. anhydrous fluoric acid was reacted with 12 ml. tetrahydrofuran and 15 ml. methylenechloride at −75° C. 2.0 g. 1,2α-methylene-Δ⁴,⁶-pregnadiene-17α-ol-3,20-dione-acetate and 4.0 g. N-chlorosuccinimide were dissolved in this mixture. The mass was subjected to stirring for 24 hours at 0° C. and then poured into 1.5 liters of water containing 50 g. sodium bicarbonate. It was then subjected to extraction with methylenechloride and the organic phase was thereafter washed with a sodium hydrosulfite solution and water and dried. The solvent was evaporated in vacuo. The residue was recrystallized from acetone/hexane. There was obtained 1.39 g. 6β-fluoro-7α-chloro-1,2α-methylene-Δ⁴-pregnene-17α-ol-3,20 - dione - acetate; M.P. 258–261° C. UV: $\epsilon_{229}=11,900$.

What is claimed as new and desired to be protected by Letters Patent is set forth in the appended claims:

1. The 1,2α-methylenesteroid of the formula

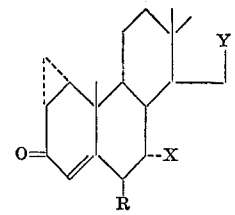

wherein R is hydroxy, acyloxy or alkoxy, or is fluorine, chlorine or bromine, wherein X is a chlorine or bromine atom and wherein Y is one of the following groups

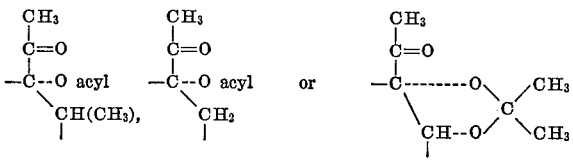

2. The 1,2α-methylenesteroid of claim 1 which is 7α-bromo - 1,2α - methylene - Δ⁴ - pregnene-6β,17α-diol-3,20-dione-17-acetate.

3. The 1,2α-methylenesteroid of claim 1 which is 7α-chloro - 1,2α - methylene - Δ⁴ - pregnene-6β,17α-diol-3,20-dione-17-acetate.

4. The 1,2α-methylenesteroid of claim 1 which is 6β,7α - dichloro - 1,2α - methylene-Δ⁴-pregnene-17α-ol-3,20-dione-acetate.

5. The 1,2α-methylenesteroid of claim 1 which is 6β-chloro - 7α - bromo-1,2α-methylene-Δ⁴-pregnene-17α-ol-3,20-dione-acetate.

6. The 1,2α-methylenesteroid of claim 1 which is 6β,7α - dibromo - 1,2α - methylene-Δ⁴-pregnene-17α-ol-3,20-dione-acetate.

7. The 1,2α-methylenesteroid of claim 1 which is 7α-chloro - 1,2α - methylene - Δ⁴ - pregnene-6β,17α-diol-3,20-dione-diacetate.

8. The 1,2α-methylenesteroid of claim 1 which is 7α-bromo - 1,2α - methylene-Δ⁴-pregnene-6β,17α-diol-3,20-dione-diacetate.

9. The 1,2α-methylenesteroid of claim 1 which is 7α-chloro - 1,2α - methylene - Δ⁴ - pregnene-6β,17α-diol-3,20-dione-6-formate-17-acetate.

10. The 1,2α-methylenesteroid of claim 1 which is 7α-bromo - 1,2α - methylene - Δ⁴ - pregnene-6β,17α-diol-3,20-dione-6-formate-17-acetate.

11. The 1,2α-methylenesteroid of claim 1 which is 7α-bromo - 1,2α - methylene - Δ⁴ - pregnene-6β,17α-diol-3,20-dione-17-acetate-6-methylether.

12. The 1,2α-methylenesteroid of claim 1 which is 7α-chloro - 1,2α - methylene - Δ⁴ - pregnene-6β,17α-diol-3,20-dione-17-acetate-6-methylether.

13. The 1,2α-methylenesteroid of claim 1 which is 6β- fluoro-7α-bromo - 1,2α - methylene - Δ⁴ - pregnene-17α-ol-3,20-dione-acetate.

14. The 1,2α-methylenesteroid of claim 1 which is 7α-bromo - 16α - methyl - 1,2α - methylene-Δ⁴-pregnene-6β,17α-diol-3,20-dione-17-acetate.

15. The 1,2α-methylenesteroid of claim 1 which is 7α-chloro - 16α,17α-dimethylmethylenedioxy-1,2α-methylene-Δ⁴-pregnene-6β-ol-3,20-dione.

16. The 1,2α-methylenesteroid of claim 1 which is 7α-bromo - 1,2α - methylene - Δ⁴ - pregnene-6β,17α-diol-3,20-dione-17-capronate.

17. The 1,2α-methylenesteroid of claim 1 which is 6β-fluoro - 7α - chloro - 1,2α - methylene-Δ⁴-pregnene-17α-ol-3,20-dione-acetate.

18. A pharmaceutical composition comprising a compound as defined in claim 1 and a pharmaceutically acceptable carrier therefor.

19. The method of administering to a patient requiring progestational treatment a compound as defined in claim 1 by oral application of tablets containing 0.5 to 10 mg. of the said compound or aqueous solutions containing 0.5 to 2 mg. of said compound per each ml. of solution.

20. The process of applying to a patient requiring progestational treatment a compound as defined in claim 1 by intramuscular injection of an oily solution containing between 1 and 20 mg. of the said compound per each ml. of solution.

References Cited

UNITED STATES PATENTS

| | | | |
|---|---|---|---|
| 3,439,093 | 4/1969 | Hader et al. | 424—243 |
| 3,127,396 | 3/1964 | Wiechert et al. | 260—239.5 |

OTHER REFERENCES

Bowers et al., Journ. Amer. Chem. Soc., August 1960, pp. 4001–4007.

LEWIS GOTTS, Primary Examiner

E. G. LOVE, Assistant Examiner

U.S. Cl. X.R.

260—239.55, 397.4; 424—243